(12) United States Patent
Kim

(10) Patent No.: US 6,882,213 B2
(45) Date of Patent: Apr. 19, 2005

(54) TEMPERATURE DETECTION CIRCUIT INSENSITIVE TO POWER SUPPLY VOLTAGE AND TEMPERATURE VARIATION

(75) Inventor: Chan-Yong Kim, Suwon-shi (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 10/697,475

(22) Filed: Oct. 29, 2003

(65) Prior Publication Data

US 2004/0135599 A1 Jul. 15, 2004

(30) Foreign Application Priority Data

Jan. 14, 2003 (KR) .................... 10-2003-0002472

(51) Int. Cl.[7] ................................................. H03K 3/42
(52) U.S. Cl. .................... 327/512; 327/513; 327/83; 327/138
(58) Field of Search .................... 327/512, 513, 327/83, 138, 262, 538, 539; 374/133, 173

(56) References Cited

U.S. PATENT DOCUMENTS 4,052,744 A * 10/1977 Boothman et al. .......... 361/103
5,886,515 A * 3/1999 Kelly ......................... 323/313
6,697,205 B1 * 2/2004 Cyrusian et al. .............. 360/68

* cited by examiner

Primary Examiner—Timothy P. Callahan
Assistant Examiner—Hiep Nguyen
(74) Attorney, Agent, or Firm—F. Chau & Associates, LLC

(57) ABSTRACT

A temperature detection circuit comprises an OP amp, a reference current generator, a temperature detection voltage generator, a comparator, and a band gap reference voltage generator. The OP amp receives a band gap reference voltage and a first voltage. The reference current generator generates the first voltage and a reference voltage in response to an output signal of the OP amp. The temperature detection voltage generator generates a temperature detection voltage in response to an ambient temperature and the output signal of the OP amp. The comparator compares the reference voltage with the temperature detection voltage to generate a temperature control signal. The band gap reference voltage generator generates the band gap reference voltage. Accordingly, the temperature detection circuit of the present invention can perform high or low temperature detection stably in supply voltage and temperature variations and thus protect the operation of the integrated circuit.

13 Claims, 4 Drawing Sheets

High Temperature Detection

TEMPERATURE DETECTION CIRCUIT INSENSITIVE TO POWER SUPPLY VOLTAGE AND TEMPERATURE VARIATION

BACKGROUND OF THE INVENTION

1. Field of the Invention

The present invention relates to a semiconductor integrated circuit, and more particularly, to a temperature detection circuit insensitive to a supply voltage and temperature variation.

2. Description of the Related Art

Various manufacturing processes implement temperature monitoring for process control. In addition, microcontrollers or microprocessors use methods of measuring temperature in digital format. Integrated circuits (IC) typically do not use external components for measuring temperature, but directly read out temperature digitally. Such an IC temperature detector may be embedded in another integrated circuit.

Typically, an IC has a predetermined operational temperature range, outside of which errors, including device failure, can occur. To ensure that the IC does not operate outside the predetermined operational temperature range, a temperature detector is disposed inside the IC. If the temperature of the IC exceeds a predetermined temperature, the temperature detector makes the IC stop its operation so as to prevent an occurrence of data error and reliability problems. However, the conventional temperature detection circuits are generally sensitive to a supply voltage and semiconductor process variation.

Accordingly, there is a need for a temperature detection circuit that is insensitive to a supply voltage variation and temperature variation.

SUMMARY OF THE INVENTION

Accordingly, the present invention is directed to a temperature detection circuit that substantially obviates one or more problems due to the limitations and disadvantages of the related art.

It is an object of the present invention to provide a temperature detection circuit that is insensitive to a supply voltage and temperature variation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an embodiment of the present invention, a temperature detection circuit comprises an OP amp, a reference current generator, a temperature detection voltage generator, a comparator, and a band gap reference voltage generator. The OP amp receives a band gap reference voltage and a first voltage. The reference current generator generates the first voltage and a reference voltage in response to an output signal of the OP amp. The temperature detection voltage generator generates a temperature detection voltage in response to an ambient temperature and the output signal of the OP amp. The comparator compares the reference voltage with the temperature detection voltage and generates a temperature control signal. The band gap reference voltage generator generates the band gap reference voltage.

The band gap reference voltage generator comprises a first reference current unit including a first PMOS transistor, a first resistor, and a first PNP transistor, which are connected in cascade between a supply voltage and a ground voltage. The band gap reference voltage generator further comprises a second reference current unit including a second PMOS transistor, a second resistor, a third resistor and a second PNP transistor, which are connected in cascade between the supply voltage and the ground voltage. The band gap reference voltage generator comprises an OP amp having a first input terminal connected to a first node between the first resistor and the first PNP transistor, a second input terminal connected to a second node between the second resistor and the third resistor, and an output terminal connected to gates of first and second PMOS transistors. The first and second PNP transistors have bases connected to a bias voltage. The reference current generator comprises a first PMOS transistor having a source connected to the supply voltage and a gate connected to an output terminal of the OP amp, and first to third resistors connected in series between a drain of the first PMOS transistor and the ground voltage. Here, the voltage level between the first resistor and the second resistor is the first voltage. The temperature detection voltage generator comprises a second PMOS transistor has a source connected to the power supply voltage and a gate connected to the output terminal of the OP amp, fourth and fifth resistors connected in series to a drain of the second PMOS transistor, and a diode-connected PNP transistor provided between the fifth resistor and the ground voltage. Here, the voltage level between the fourth resistor and the fifth resistor is the temperature detection voltage.

Accordingly, the temperature detection circuit of the present invention detects high temperature and low temperature stably in spite of a supply voltage and temperature variation and thus protects the operation of the integrated circuit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Figure 1:
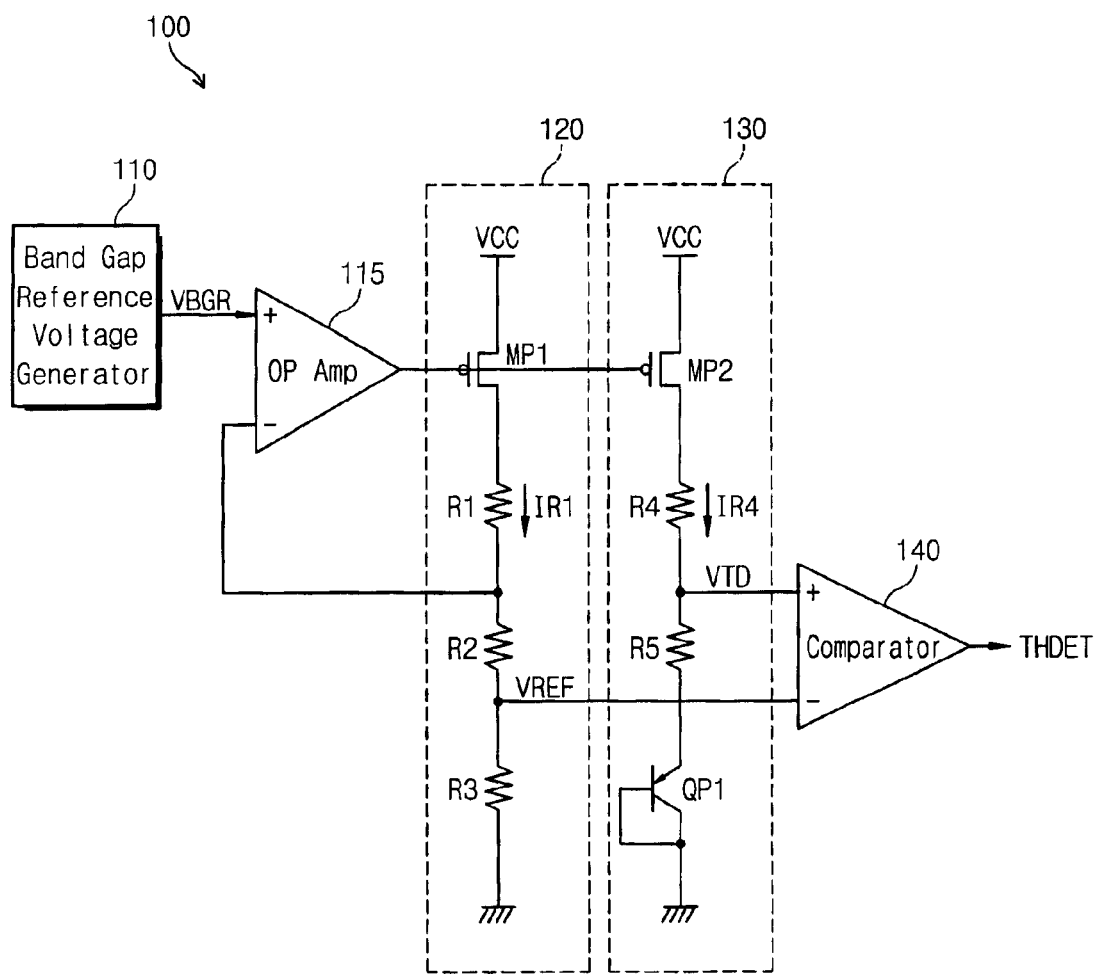
FIG. 1 is a schematic diagram of a temperature detection circuit according to an embodiment of the present invention.

Reference will now be made in detail to the preferred embodiments of the present invention, examples of which are illustrated in the accompanying drawings. However, the present invention is not limited to the embodiments illustrated herein, and the embodiments herein are rather introduced to provide easy and complete understanding of the scope and spirit of the present invention. Wherever possible, the same reference numerals will be used throughout the drawings to refer to the same or like parts.

FIG. 1 illustrates a temperature detection circuit according to an embodiment of the present invention. Referring to FIG. 1, the temperature detection circuit 100 includes a band gap reference voltage generator 110, an OP amp 115, a reference current generator 120, a temperature detection voltage generator 130, and a comparator 140. The temperature detection circuit 100 is manufactured through CMOS processes. The band gap reference voltage generator 110 generates the band gap reference voltage VBGR. The band gap reference voltage VBGR is received by the OP amp 115. The reference current generator 120 generates a reference voltage VREF in response to an output signal of the OP amp 115. In response to the output signal of the OP amp 115, the temperature detection voltage generator 130 generates a temperature detection voltage VTD according to temperature variation. The comparator 140 compares the reference voltage VREF with the temperature detection voltage VTD to generate a temperature control signal THDET.

Figure 2:
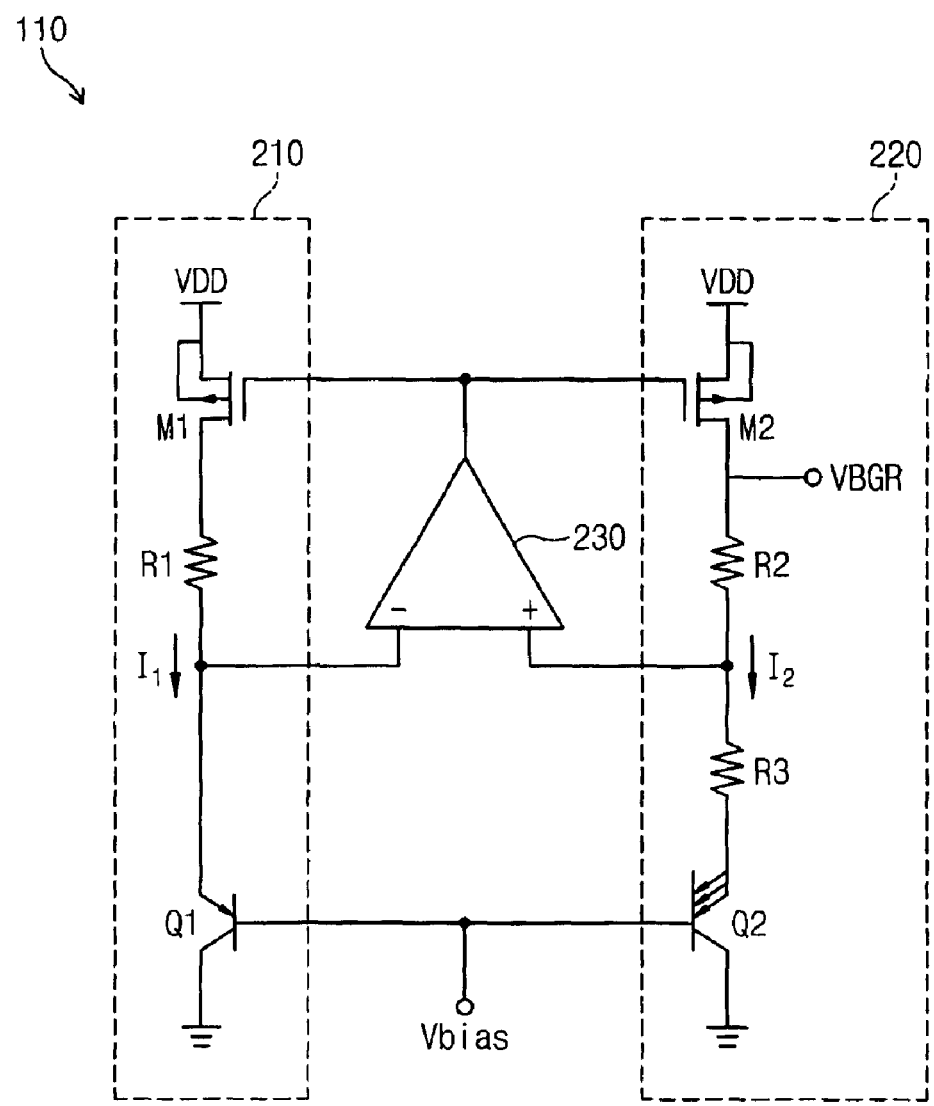
FIG. 2 is a circuit diagram of a band gap reference voltage generator shown in FIG. 1.

The band gap reference voltage generator 10 generates a stable band gap reference voltage VBGR. The band gap reference voltage VBGR is unaffected by supply voltage and temperature variation. The band gap reference voltage generator 110 can be implemented in various configurations. In FIG. 2, the band gap reference voltage generator 110 is shown as implemented by CMOS processes. Referring to FIG. 2, the band gap reference voltage generator 110 includes a first reference current unit 210, a second reference current unit 220, and an OP amp 230. The first reference current unit 210 includes a first PMOS transistor M1, a first resistor R1, and a first PNP transistor Q1, which are connected in cascade between a supply voltage VDD and a ground voltage. The second reference current unit 220 includes a second PMOS transistor M2, a second resistor R2, a third resistor R3 and a second PNP transistor Q2, which are connected in cascade between the supply voltage VDD and the ground voltage. The OP amp 230 has a first input terminal connected to a first node N1 between the first resistor R1 and the first PNP transistor Q1, a second input terminal connected to a second node N2 between the second resistor R2 and the third resistor R3, and an output terminal connected to gates of first and second PMOS transistors M1 and M2. The first and second PNP transistors Q1 and Q2 have bases connected to a bias voltage Vbias.

The band gap reference voltage generator 110 uses a current source controlled by the output signal of the OP amp 230. Biasing currents $I_1$ and $I_2$ depend on gate-source voltages (VGS) of the transistors M1 and M2. Accordingly, although the output of the OP amp 230 is shifted, a mismatch of the biasing currents I1 and I2 will occur if the transistors M1 and M2 are matched to each other, because the variations in the gate-source voltages VGS of the transistors M1 and M2 are equal to each other. Therefore, the band gap reference voltage VBGR is stably generated at a voltage level of about 1.26 V regardless of the supply voltage and temperature variation.

Returning to FIG. 1, the reference current generator 120 includes a first PMOS transistor MP1 gated to the OP amp 115, and first to third resistors R1, R2, and R3 connected in series to a drain of the first PMOS transistor MP1. The first current IR1 flows through the first PMOS transistor MP1 and the first to third resistors R1, R2, and R3. A node voltage between the first resister R1 and the second resistor R2 is a first internal voltage Va and a node voltage between the second resistor R2 and the third resister R3 is the reference voltage VREF.

The OP amp 115 performs an operation so that the band gap reference voltage VBGR and the first internal voltage Va have the same voltage level. The OP amp 115 outputs a predetermined voltage signal that turns on the first PMOS transistor MP1. If the first internal voltage Va is lower than the band gap reference voltage VBGR, the OP amp 115 generates a voltage signal whose level is substantially equal to a ground voltage VSS and turns on the first PMOS transistor MP1 strongly, so that a large amount of a current IR1 flows. The large amount of the current IR1, which flows through the second and third resistors R2 and R3, increases a level of the first internal voltage Va. As a result, the level of the first internal voltage Va becomes equal to that of the band gap reference voltage VBGR. If the first internal voltage Va is higher than the band gap reference voltage VBGR, the OP amp 115 generates a voltage signal whose level is substantially equal to the power supply voltage VCC and turns on the first PMOS transistor MP1 weakly so that a small amount of the current IR1 flows. The small amount of the current IR1, which flows through the second and third resistors R2 and R3, decreases a level of the internal voltage Va. As a result, the level of the high first internal voltage Va becomes equal to that of the band gap reference voltage VBGR.

Here, the current IR1 flowing across the first resistor R1 is expressed as follows:

$$IR1 = \frac{Va}{R2+R3}$$

Since the first internal voltage Va is equal to the band gap reference voltage VBGR, the current IR1 flowing across the first resistor R is given by Expression 1.

$$IR1 = \frac{VBGR}{R2+R3} \qquad \text{(Expression 1)}$$

The reference voltage VREF is expressed as follows:

$$VREF = Va \times \frac{R3}{R2+R3} = VBGR \times \frac{R3}{R2+R3}.$$

The temperature detection voltage generator 130 includes a second PMOS transistor MP2, fourth and fifth resistors R4 and R5, and a PNP transistor QP1, which are connected in cascade between the power supply voltage VCC and the ground voltage VSS. The second PMOS transistor MP2 is gated to the output signal of the OP amp 115. A node voltage between the fourth resistor R4 and the fifth resistors R5 is the temperature detection voltage VTD.

Here, since the gate-source voltage (VGS) of the first PMOS transistor MP1 is equal to that of the second PMOS transistor MP2, the current flowing across the first PMOS transistor MP1 is equal to the current flowing across the second PMOS transistor MP2.

In other words, IMP1=IMP2, and thus IR1=IR4. Therefore, the temperature detection voltage VTD can be expressed as follows:

$$VTD=VBE(QP1)+IR4 \times R5=VBE(QP1)+IR1 \times R5 \qquad \text{(Expression 2)}$$

Meanwhile, the first to fifth resistors R1, R2, R3, R4, and R5 are set to have the same temperature constant. Even if the resistances are changed due to an ambient temperature variation, the voltage appearing between both ends of each resistor is maintained in a steady state. If the resistance of the fifth resistor R5 increases according to a temperature based on the corresponding temperature constant, the voltage VR5 appearing between both ends of the fifth resistor R5 is expressed as follows:

$$VR5=IR5\times(R5+\Delta R5)=IR1\times(R5+\Delta R5).$$

Since the second and third resistors have also the same temperature constant, it can be seen from Expression 1 that the current IR1 flowing across the first resistor R1 decreases, and the current IR1 is expressed as follows:

$$IR1 = \frac{VBGR}{R2+\Delta R2+R3+\Delta R3}.$$

Since IR1=IR5, the current IR5 flowing across the fifth resistor R5 also decreases. Accordingly, the voltage VR5 appearing between both ends of the fifth resistor R5 is steady without regard to ambient temperature variation.

The temperature detection voltage VTD expressed in Expression 3 is based on Expression 2.

$$VTD=VBE(QP1)+IR4\times R5=VBE(QP1)+IR1\times R5= VBE+VR5 \quad \text{(Expression 3)}$$

As described above, since the voltage appearing between both ends of the fifth resistor R5 does not depend on temperature, the temperature detection voltage VTD is affected by the base-emitter voltage (VBE) of the PNP transistor QP1. The PNP transistor QP1 has a parasitic structure due to CMOS processes and has a temperature constant of –2 mV/° C. Therefore, the PNP transistor has a characteristic that a voltage decreases as the temperature increases.

The comparator 140 compares the reference voltage VREF with the temperature detection voltage VTD and generates a temperature control signal when the temperature detection voltage VTD is lower than the reference voltage VREF. The temperature control signal THDET is used as a signal to disable the internal operation of the integrated circuit.

Figure 3:
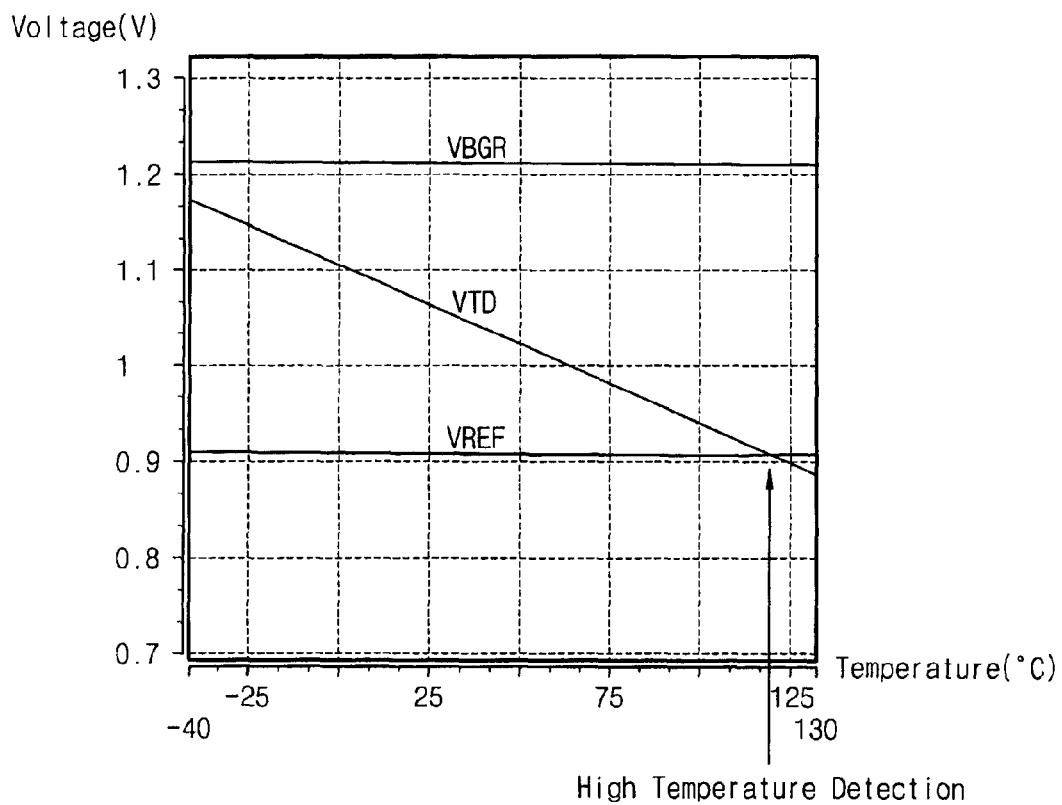
FIG. 3 is a behavior graph of the temperature detection circuit shown in FIG. 1.
Figure 4:
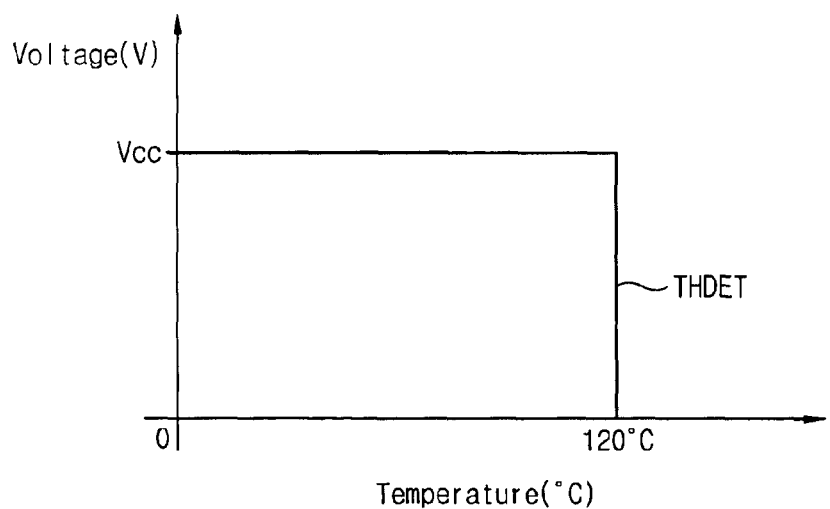
FIG. 4 is a graph showing a generation of the temperature control signal of FIG. 1.

FIGS. 3 and 4 are behavior graphs of the temperature detection circuit 100 shown in FIG. 1. Referring to FIG. 3, the band gap reference voltage VBGR is generated steadily at the level of about –1.2 V in the temperature range from –40° C. to 130° C. and the reference voltage VREF is generated steadily at the level of about –0.9 V. The temperature detection voltage VTD has a negative slope. At the temperature at which the temperature detection voltage VTD is lower than the reference voltage VREF, that is, about at 120° C., the temperature detection circuit 100 generates the low-level temperature control signal THDET indicating a high temperature threshold for operation of an integrated circuit. This is illustrated in FIG. 4. The low-level temperature control signal THDET stops the operation of the integrated circuit.

Figure 5:
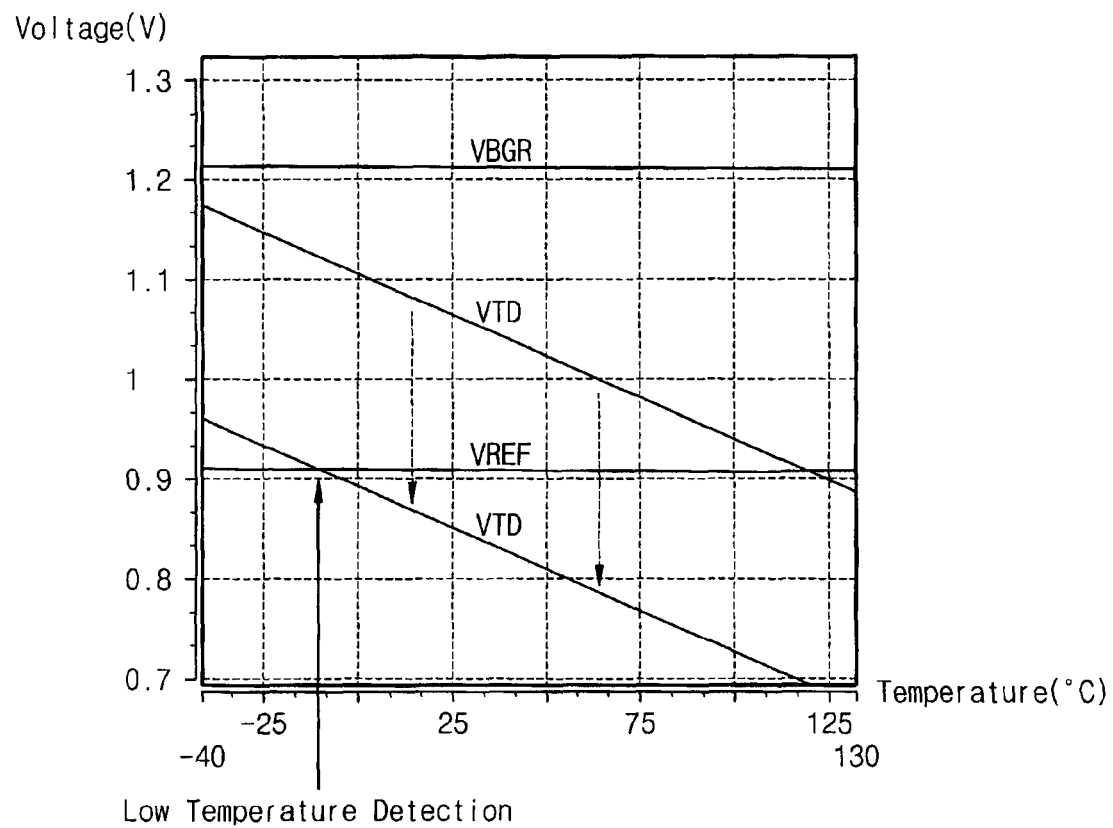
FIG. 5 is a behavior graph of the temperature detection circuit according to an application of the present invention.

FIG. 5 is a behavior graph of the temperature detection circuit 100, indicating a low temperature threshold for operation of an integrated circuit according to an application of the present invention. Referring to FIG. 5, the resistance of the fourth resistor R4 increases, and the resistance of the fifth resistor R5 decreases in the temperature detection circuit 100 so that the graph of the temperature detection voltage VTD is shifted downwardly. This means that decreasing the current IR4 and the resistance of the resistor R5 lowers the level of the temperature detection voltage VTD.

Accordingly, the temperature detection circuit of the present invention can perform high or low temperature detection stably despite variations in supply voltage and ambient temperature and thus protect the operation of the integrated circuit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A temperature detection circuit comprising:
   an OP amp for receiving a band gap reference voltage and a first voltage;
   a reference current generator for generating the first voltage and a reference voltage signal in response to an output signal of the OP amp, wherein the reference current generator comprises a first PMOS transistor comprising a source connected to a power supply voltage and a gate connected to an output terminal of the OP amp, and first to third resistors connected in series between the first PMOS transistor and the ground voltage, a voltage level between the first resistor and the second resistor being the first voltage;
   a temperature detection voltage generator for generating a temperature detection voltage in response to an ambient temperature and the output signal of the OP amp; and
   a comparator for comparing the reference voltage signal with the temperature detection voltage signal to generate a temperature control signal.

2. The temperature detection circuit of claim 1, further comprising a band gap reference voltage generator for generating the band gap reference voltage, the band gap reference voltage generator comprising:
   a first reference current unit comprising a first PMOS transistor, a first resistor and a first PNP transistor, which are connected in cascade between a supply voltage and a ground voltage;
   a second reference current unit comprising a second PMOS transistor, a second resistor, a third resistor and a second PNP transistor, which are connected in cascade between the supply voltage and the ground voltage; and
   an OP amp comprising a first input terminal connected to a first node between the first resistor and the first PNP transistor, a second input terminal connected to a second node between the second resistor and the third resistor, and an output terminal connected to gates of first and second PMOS transistors,
   the first and second PNP transistors having bases connected to a bias voltage.

3. The temperature detection circuit of claim 1, wherein the temperature detection voltage generator comprises:
   a second PMOS transistor having a source connected to a supply voltage and a gate connected to an output terminal of the OP amp;
   fourth and fifth resistors connected in series to a drain of the second PMOS transistor; and
   a diode-connected PNP transistor provided between the fifth resistor and the ground voltage,
   a voltage level between the fourth resistor and the fifth resistor being the temperature detection voltage.

4. The temperature detection circuit of claim 1, wherein the temperature detection circuit is manufactured through CMOS processes.

5. A temperature detection circuit comprising:
- amplifier means for receiving a band gap reference voltage and a first voltage;
- reference current generator means for generating the first voltage and a reference voltage signal in response to an output signal of the amplifier means, wherein the reference current generator means comprises a first field effect transistor comprising a source connected to a power supply voltage and a gate connected to an output terminal of the amplifier means, and first through third resistors connected in series between the first field effect transistor and the ground voltage, a voltage level between the first resistor and the second resistor being the first voltage;
- temperature detection means for generating a temperature detection voltage in response to a temperature of the temperature detection circuit and the output signal of the amplifier means; and
- comparator means for comparing the reference voltage signal with the temperature detection voltage signal to generate a temperature control signal.

6. The temperature detection circuit of claim 5, further comprising a band gap reference voltage generator means for generating the band gap reference voltage.

7. The temperature detection circuit of claim 6, wherein the band gap reference voltage generator means comprises:
- a first reference current unit comprising a first field effect transistor, a first resistor and a first bipolar transistor, which are connected in cascade between a supply voltage and a ground voltage;
- a second reference current unit comprising a second field effect transistor, a second resistor, a third resistor and a second bipolar transistor, which are connected in cascade between the supply voltage and the ground voltage; and
- an operational amplifier comprising a first input terminal connected to a first node between the first resistor and the first bipolar transistor, a second input terminal connected to a second node between the second resistor and the third resistor, and an output terminal connected to gates of first and second field effect transistors,
- the first and second bipolar transistors having bases connected to a bias voltage.

8. The temperature detection circuit of claim 5, wherein the temperature detection voltage generator means comprises:
- a second field effect transistor having a source connected to a supply voltage and a gate connected to an output terminal of the operational amplifier;
- fourth and fifth resistors connected in series to a drain of the second field effect transistor; and
- a diode-connected bipolar transistor provided between the fifth resistor and the ground voltage,
- a voltage level between the fourth resistor and the fifth resistor being the temperature detection voltage.

9. The temperature detection circuit of claim 5, wherein the temperature detection circuit is manufactured through CMOS processes.

10. A temperature detection circuit comprising:
- an OP amp for receiving a band gap reference voltage and a first voltage;
- a reference current generator for generating the first voltage and a reference voltage signal in response to an output signal of the OP amp;
- a temperature detection voltage generator for generating a temperature detection voltage in response to an ambient temperature and the output signal of the OP amp, wherein the temperature detection voltage generator comprises a second PMOS transistor having a source connected to a supply voltage and a gate connected to an output terminal of the OP amp, fourth and fifth resistors connected in series to a drain of the second PMOS transistor, and a diode-connected PNP transistor provided between the fifth resistor and the ground voltage,
- a voltage level between the fourth resistor and the fifth resistor being the temperature detection voltage; and
- a comparator for comparing the reference voltage signal with the temperature detection voltage signal to generate a temperature control signal.

11. The temperature detection circuit of claim 10, the reference current generator comprises:
- a first PMOS transistor comprising a source connected to a power supply voltage and a gate connected to an output tenninal of the OP amp; and
- first to third resistors connected in series between the first PMOS transistor and the ground voltage, a voltage level between the first resistor and the second resistor being the first voltage.

12. The temperature detection circuit of claim 10, further comprising a band gap reference voltage generator for generating the band gap reference voltage, the band gap reference voltage generator comprising:
- a first reference current unit comprising a first PMOS transistor, a first resistor and a first PNP transistor, which are connected in cascade between a supply voltage and a ground voltage;
- a second reference current unit comprising a second PMOS transistor, a second resistor, a third resistor and a second PNP transistor, which are connected in cascade between the supply voltage and the ground voltage; and
- an OP amp comprising a first input terminal connected to a first node between the first resistor and the first PNP transistor, a second input terminal connected to a second node between the second resistor and the third resistor, and an output terminal connected to gates of first and second PMOS transistors,
- the first and second PNP transistors having bases connected to a bias voltage.

13. The temperature detection circuit of claim 10, wherein the temperature detection circuit is manufactured through CMOS processes.

* * * * *